Sept. 22, 1953  E. C. BALLMAN  2,653,208
APPARATUS FOR RIVETING LAMINATED STRUCTURES
FOR ELECTRICAL APPARATUS
Filed Aug. 17, 1946

INVENTOR:
EDWIN C. BALLMAN
BY Bruninga & Sutherland
ATTORNEYS.

Patented Sept. 22, 1953

2,653,208

UNITED STATES PATENT OFFICE 2,653,208

APPARATUS FOR RIVETING LAMINATED STRUCTURES FOR ELECTRICAL APPARATUS

Edwin C. Ballman, Clayton, Mo., assignor to Ballman Engineering Company, Clayton, Mo., a corporation of Missouri Application August 17, 1946, Serial No. 691,359

1 Claim. (Cl. 219—2)

This invention relates to laminated structures for electrical apparatus and has particular application to dynamo-electric machinery.

In electrical apparatus of the character described, an example of which is an electric motor in which the stator is built up of sheet steel laminations, it requires a relatively expensive construction to hold the laminations in a rigid solid mass, which is necessary to secure small tolerances. The usual practice is to punch about six or eight holes near the outer edge of the laminations, and insert long bars or rivets into the holes which are then spun or hammered over to form heads. To do this the rivet is put under great compression lengthwise, causing the rivet body to bend or to take a wave shape pressing sidewise on the rivet hole. This distorts the stator and prevents it from forming a solid rigid mass of predetermined shape and size. Similar difficulties are encountered in making of other forms of laminated structures for electrical apparatus.

One of the objects of this invention is to provide a process of making a laminated structure of the character described and a resultant product, in which the laminations are so secured as to avoid the above noted objections.

Further objects will appear from the detailed description in which will be set forth a number of embodiments of this invention; it is to be understood, however, that this invention is susceptible of various embodiments within the scope of the appended claim.

Generally stated, and in accordance with an illustrative embodiment of this invention, and where the laminations are assembled with bars traversing the laminations, the bars are subjected to an electric current and to pressures lengthwise of the bars. By making the value of the current sufficient to soften the bar under a pressure lengthwise of the bar sufficient to cause the bar to flow, a moderate pressure can be employed so that the bar will not bend or wave any appreciable amount. Where the bar protrudes beyond the assembled laminations, then the subjection of pressure lengthwise of the bar will cause heads to form on the ends of the bar. The combined action of the electric current in heating the bar to a softening point and the pressure lengthwise of the bar will cause the bar to expand laterally in the perforations, so as to fill the same. Upon cooling of the bar, while it will shrink in all directions, the shrinkage traversely is slight, but longitudinally is considerable, so as to tightly clamp the laminae together.

A laminated structure of the character described, made in accordance with the process embodying this invention is, therefore, a structure in which the bars or rivets have been expanded laterally, and more particularly pressure-expanded laterally, in the perforations. These bars traversing the laminations are anchored therein and heat-shrunk longitudinally.

In accordance with an illustrative embodiment of this invention, the subjection of the bar to a pressure lengthwise thereof is for a predetermined distance in order to provide for predetermined distances between the ends of the bar. This can be accomplished by determining the distance by a datum means related to the assembled laminations.

In accordance with another illustrative embodiment of this invention, the laminated structure of the character described, with or without bars traversing the laminations, is immersed in a varnish of the synthetic polymerizing type for a period sufficient to cause the varnish to flow between the laminations; the assembly is then heated to polymerize the varnish.

Figure 1:
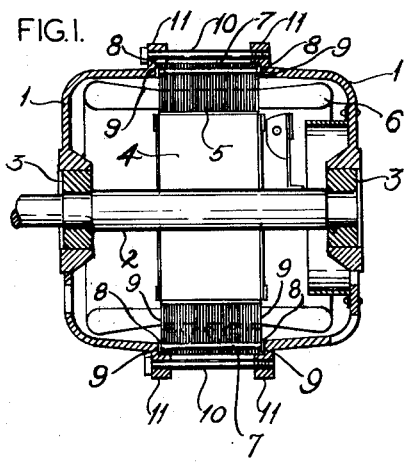
Figure 1 is a section partly in elevation of an electric motor, showing the environment and application of this invention to such an apparatus.
Figure 1A:
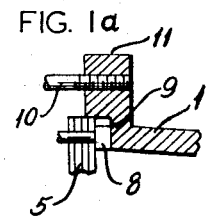
Figure 1a is a detail.

Referring now to the accompanying drawings, and more particularly to Figure 1, this figure shows the application of this invention to an electric motor in which 1 designates the frame comprising a pair of end plates, 2 the shaft mounted in suitable bearings 3, 4 the rotor made up of laminae, and 5 the stator also made up of laminae. The motor can be of any suitable and usual construction, and for this purpose the rotor can be provided with any suitable winding, and likewise the stator, with any suitable winding, generally shown at 6, which as usual is in slots in the laminated stator structure. Bars or rivets 7, headed as shown at 8 secure the laminations together and there bear or fit against shoulders 9 on the end plates. Bolts or screws 10 pass through flanges or lugs 11 on the end plates to secure the entire structure.

Figure 2:
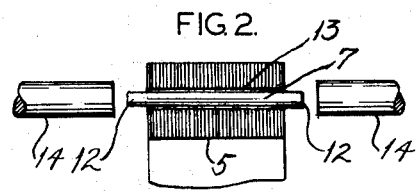
Figure 2 is a detail, diagrammatic in form, showing one step of the process.
Figure 3:
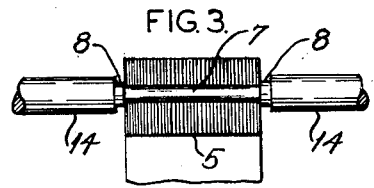
Figure 3 is a view similar to Figure 2, showing another stage in the process.

Referring now to Figures 2 and 3, in which again 5 shows the laminated stator structure and 7 the bars or rivets, these bars are of a length to protrude beyond the laminated structure, as shown at 12. In order to place these bars within the perforations of the laminae the latter will, of course, have to be somewhat larger than the bar, the perforation being exaggerated at 13. The bars are generally made of such length as to project at each end beyond the laminae to twice the diameter of the bar. In these figures, 14 designates a pair of electrodes for carrying heavy current and these may be of the form and character as usually employed in spot welding. Assuming that these electrodes are connected to a source of current, upon moving them against the ends of the bar an electric current will be caused to pass therethrough, so as to soften the same. By then applying pressure to the electrodes and against the bar, the metal of the bar is caused to flow expanding the same within the perforations and also forming heads 8, as shown in Figure 3. To accomplish this, for instance in a bar 1/8" in diameter, it is only necessary to bring the bar to a red heat; and in such a case moderate pressure can be applied, viz., about 300 to 500 lbs. This will cause the bar to flow to fill the perforations, and then the ends will squash to form the heads. By permitting the electrodes to move only fixed amounts, the length of the rivet head may be controlled. The bar being soft during the flow of the current, swells and expands to fill the perforations; however, after the bar cools it shrinks considerably in length, although not materially traversely; accordingly while the bar is put under tension to hold the laminations rigidly together the holes remain filled so that there will be no distortion.

Figure 4:
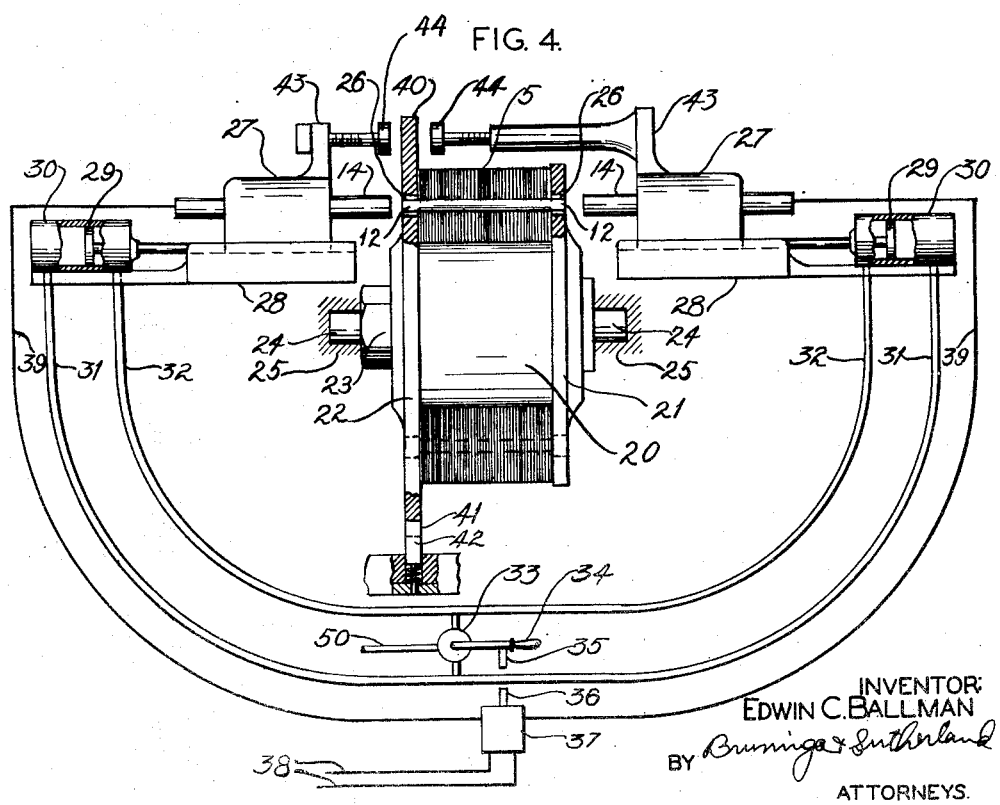
Figure 4 is a view, somewhat diagrammatic in form, showing a form of apparatus susceptible of carrying out the process.

Referring to Figure 4, this illustrates, although only diagrammatically in a general way, an apparatus which may be used for carrying out this process. The assembled laminations 5 are mounted on a suitable mandrel 20 provided with an end plate 21, and a second removable end plate 22, secured by a nut 23 screwed on the mandrel. The mandrel is provided with bearings 24 supported by bearing boxes 25. Each end plate is provided with enlarged openings 26 sufficiently large to clear the electrodes 14. The electrodes are insulatedly mounted in slides 27, moving in ways on a base 28. Each slide 27 may be moved in any suitable manner, as by being connected with a piston 29 of a fluid pressure cylinder 30 connected by lead pipes 31 and 32 to a source of fluid 50, such as air through a valve 33 provided with a handle 34, which latter may be provided with a lug 35 engaging an arm 36 on a suitable switch 37, preferably of the time control type, connected with a source of current 38 and with leads 39 to the electrodes 14.

One of the plates 21 or 22, in this case the plate 22, is extended radially, as shown at 40, to provide a datum means hereinbefore referred to. It is also provided with notches 41 for engagement with a spring pressed detent 42, one opposite each set of perforations. Each of the slides 27 is provided with an arm 43 for receiving a stop 44 adjustable in the arm and adapted to engage the extension 40.

Assuming the parts are in the position shown in Figure 4, the procedure is as follows. On moving the valve 33 clockwise by means of the handle 34, the pipes 31 leading to the ends of the cylinders 30 are connected with a fluid source of supply, causing electrodes 14 to move towards the ends 12 of the bar 7, which are at this time held in alignment with the electrodes by the detent 42 engaging the notch 41. Further movement of the arm 34 will cause the lug 35 to engage the arm 36 of the switch 37, so as to close the electrode circuit. Heat and pressure will, therefore, be applied, and because the current is rather large the heating up of the bar 7 will be quick, so as to soften the same while pressure is being applied. This will first cause the bar 7 to expand in its perforation, and then will cause the heads 8 to form, as shown in Figure 3. Further movement of the electrodes is, however, arrested by the stops 44 striking the extension 40, which forms a datum for determining the size of the head as well as the overall length of the bar in a very accurate manner. By providing a time switch 37 the current will be automatically turned off as about after five seconds duration, in order to accomplish the desired results. The operator can then move the handle 34 in the reverse direction, so as to now connect the ends of the cylinder 30 with the source by the pipes 32, the valve causing the fluid to exhaust from the other ends of the cylinders. This will cause the electrodes to return to their original position. The completed laminated structure can then be removed.

While a laminated structure can be machined on both faces of the bar or rivet heads so as to fit the rabbets or shoulders 9 in the end plates, this is generally not necessary because of the fact that the electrodes form a face, and because of the fact that the overall length of the bar or rivet is closely dimensioned. The structure can, therefore, be directly mounted in the frame and will accurately line up with the rotor without distortion or any further machining.

In accordance with another embodiment of this invention, a laminated structure of the character described is immersed in a varnish of a synthetic polymerizing type for a period sufficient to cause the varnish to flow between the laminations. This can be accomplished by providing a thin solution and continuing with the immersion long enough so that the capillary action draws the varnish between the laminations. The laminated structure can then be heated to a temperature necessary to cure or polymerize the varnish. This method of construction provides a laminated structure which is very solid and rigid and is particularly applicable for small structures where it can be employed without the necessity of bars or rivets, particularly where the mechanical design of the frame is such that the assembling bolts hold the structure in compression. This method may, however, be combined with the method illustrated in Figures 2, 3 and 4, by subjecting the stator to immersion after the bars have been headed. Both procedures may also be applied to a rotor or other laminated structures.

Having thus described the invention, what is claimed and desired to be secured by Letters Patent is:

A machine for making a stator for an electric motor, said stator being made up of a multiplicity of aligned perforated laminae with bars, within the perforations, traversing the laminae and with the ends of the bars protruding beyond the outer laminae, comprising a mandrel upon which the laminae are concentrically mounted, said mandrel being rotatably mounted and provided with a datum plate, a pair of electrodes mounted for movement toward opposite sides of said stator and provided with stop means to engage said datum plate when said electrodes have advanced a predetermined distance toward said stator, positioning means for holding the stator and mandrel in position against rotation to allow each of said bars to be engaged successively by the said electrodes, and a switch which, when actuated, successively moves said electrodes against a bar with a predetermined pressure and supplies electric current to the electrode while maintaining said pressure.

EDWIN C. BALLMAN.

References Cited in the file of this patent

UNITED STATES PATENTS

| Number | Name | Date |
|---|---|---|
| 396,015 | Thomson | Jan. 8, 1889 |
| 1,189,583 | Kicklighter | July 4, 1916 |
| 1,295,230 | Stevenson | Feb. 25, 1919 |
| 1,455,199 | Groten | May 15, 1923 |
| 1,594,124 | Shrader | July 27, 1926 |
| 1,848,344 | Goff | Mar. 8, 1932 |
| 1,901,334 | Reed | Mar. 14, 1933 |
| 2,255,313 | Ellis | Sept. 9, 1941 |
| 2,331,531 | Adams | Oct. 12, 1943 |
| 2,353,471 | Johndrew | July 11, 1944 |
| 2,365,147 | Speller | Dec. 12, 1944 |
| 2,390,863 | Amidon | Dec. 11, 1945 |
| 2,411,180 | Alexander | Nov. 19, 1946 |
| 2,423,869 | Blessing | July 15, 1947 |
| 2,456,381 | Clark | Dec. 14, 1948 |

OTHER REFERENCES

Dean article published in "Electrical World" of May 7, 1921, pages 1055–1057. (Copy available in Div. 38.)